May 11, 1948. M. H. KIMBALL 2,441,244
HARVESTER
Filed July 20, 1945 2 Sheets-Sheet 1
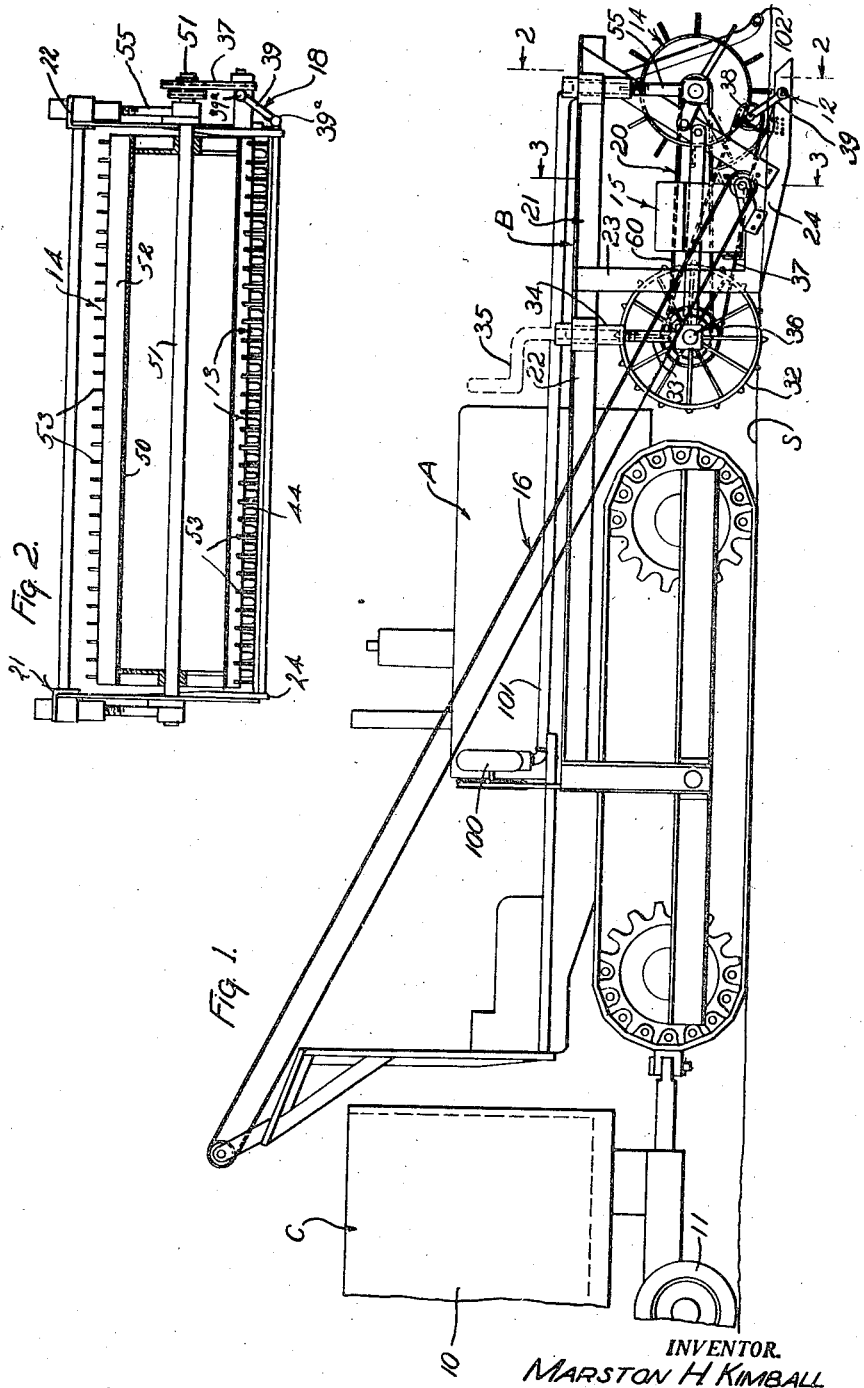
INVENTOR.
MARSTON H KIMBALL
BY
ATTORNEY May 11, 1948. M. H. KIMBALL 2,441,244
HARVESTER
Filed July 20, 1945 2 Sheets-Sheet 2
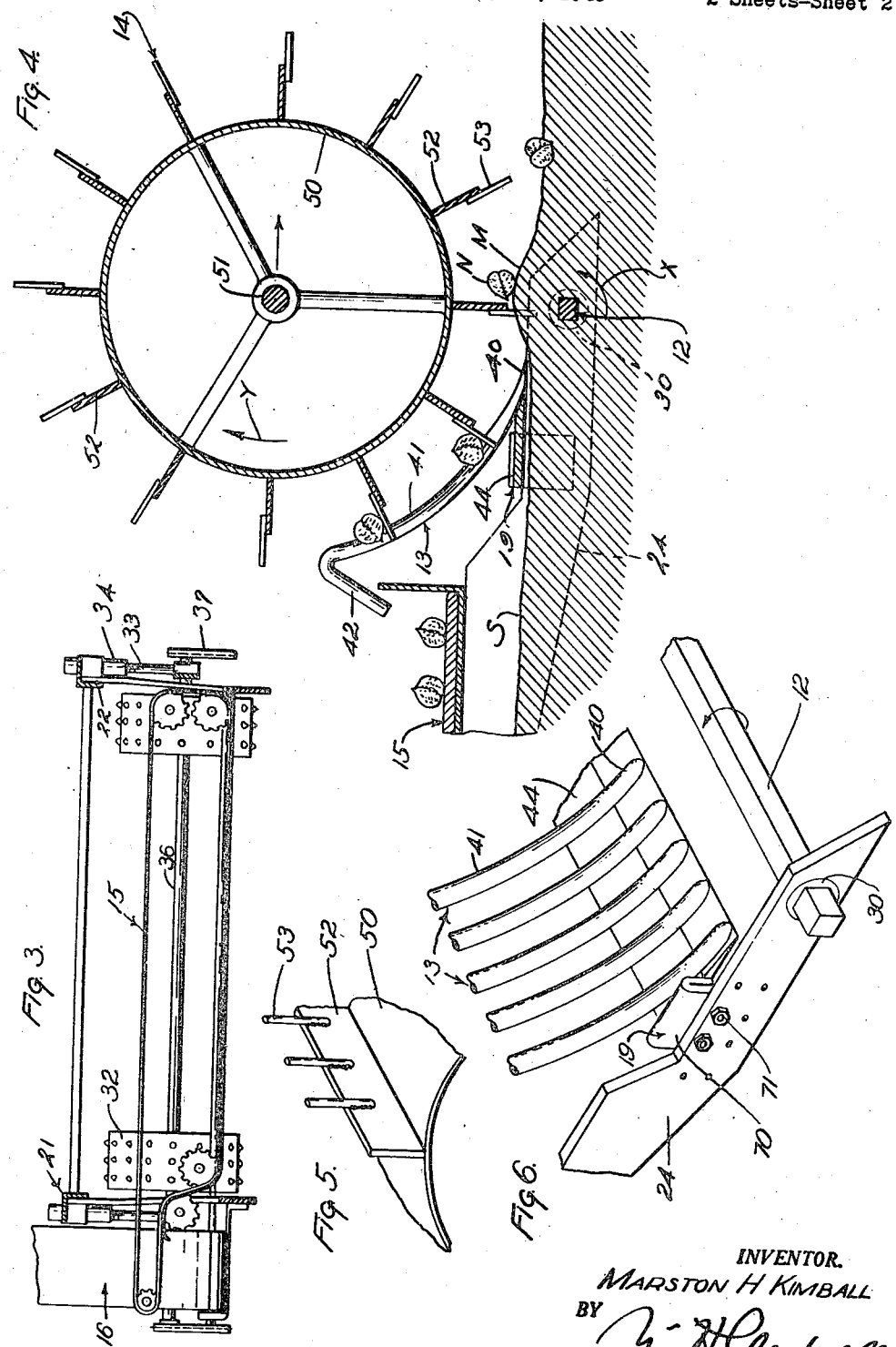
INVENTOR.
MARSTON H KIMBALL
BY
ATTORNEY Patented May 11, 1948

2,441,244

UNITED STATES PATENT OFFICE 2,441,244

HARVESTER

Marston H. Kimball, Alhambra, Calif., assignor of one-fourth to Earl Maharg, Los Angeles, Calif.

Application July 20, 1945, Serial No. 606,153

10 Claims. (Cl. 55—17)

This invention has to do with a crop harvester and is more particularly concerned with a machine for gathering objects from the ground, it being a general object of the invention to provide a simple, practical, effective mechanism for gathering objects from the ground without resort to manual labor such as is now ordinarily required for such operation.

There are various situations where objects have to be gathered from the ground. For example, the usual method of harvesting or gathering walnuts is to shake the nuts from the trees so that they are on the ground and then gather them from the ground by hand. In the average or well cared for grove the ground beneath the trees is usually dry and well broken up or worked and is, generally, free of clods. Because of the usual condition of the ground the nuts dropping from the trees often embed themselves somewhat in the ground and thus present a serious problem for mechanical gathering devices, all with the result that they are commonly or almost universally gathered from the ground by hand. In many instances cloths are spread on the ground to catch the nuts falling from the trees but this method is not altogether satisfactory as it is slow and cumbersome as it involves manipulation of large cloths.

It is a general object of my present invention to provide a harvesting or gathering machine which will operate to effectively gather objects, such as walnuts that have been shaken from trees, from the ground even though they may be partially embedded in the ground. A feature of my invention is the provision of means whereby nuts or objects that have become partially embedded in the ground are initially thrust to the surface and put in position to be effectively gathered for deposit on a conveyor, or the like.

Another object of my invention is to provide a mechanism involving few simple parts which initially positions the objects at the ground and then engages the objects to elevate them for deposit on a conveyor belt or other handling mechanism.

It is another object of my present invention to provide a simple, effective and practical combination of elements for propelling and elevating objects engaged at the ground so that they are deposited in a receptacle or on a conveyor, or the like, without danger of crushing or injuring them in any way.

The various objects and features of my invention will be fully understood from the following detailed description of a typical preferred form and application of the invention, throughout which description reference is made to the accompanying drawings, in which:

Fig. 1 is a side elevation of a unit of apparatus embodying the mechanism that I have provided;

Fig. 2 is a detailed sectional view taken substantially as indicated by line 2—2 on Fig. 1;

Fig. 3 is a detailed sectional view taken substantially as indicated by line 3—3 on Fig. 1;

Fig. 4 is an enlarged detailed sectional view through the principal elements provided by the present invention illustrating the manner in which objects such as nuts are positioned at the surface of the ground and then propelled and guided to a suitable conveyor;

Fig. 5 is a perspective view of a part of the propeller employed to engage the objects; and Fig. 6 is a perspective view of parts of the mechanism showing, generally, the relationship of the soil engaging member or lifter and the elevating fingers.

The mechanism that I have provided can be used on or in connection with various other units of equipment or, in other words, it can be used in various manners. However, in general I prefer to employ it in connection with a power driven vehicle such as a tractor and to use it in connection with a storage means such as a wheeled vehicle having a box-like body, or the like. In the drawings I have shown a typical application of the invention and have there shown a propelling vehicle in the form of a tractor A, and I have shown the pick-up mechanism B supported by the tractor to be ahead of the tractor and to be advanced thereby. In addition I have shown a crop carrier or vehicle C connected to the rear of the tractor A to be drawn thereby, which vehicle includes a box-like body 10 with suitable supporting wheels 11. The tractor illustrated is of the track-laying type, but in practice it can be any suitable type of tractor or propelling vehicle.

The pick-up mechanism B provided by my invention involves, generally, a lifter 12 disposed transversely of the path of the apparatus in engagement with the soil, elevating fingers 13 to receive and elevate objects gathered from the soil, and a propeller 14. I may further provide a transverse conveyor 15 to receive objects from the pick-up and advance them transversely of the machine and a longitudinal conveyor 16 to receive objects from the conveyor 15 so that they are carried rearwardly past the tractor A to the body 10 of carrier C.

The pick-up B includes various means or elements besides the lifter 12, fingers 13 and propeller 14. For example, it includes a drive 18 for the lifter, mounting means 19 for the fingers 13, a drive 20 for the propeller 14, a frame 21, and various other features of construction all of which will be described.

The frame 21 may, in practice, be varied widely depending upon the details employed in connection with the other elements. In the case illustrated the frame involves two main side rails 22 that are attached to the tractor A at points well above the ground and which project horizontally forward from the tractor to project a substantial distance ahead of the tractor, as shown in Fig. 1 of the drawings. A vertical post 23 depends from each rail 22 to a point at or close to the normal surface S of the ground and a horizontal arm 24 projects forward from the lower end of each post. The arms 24 being below the forward end portions of the rails 22 are spaced a substantial distance apart or are at the sides of the mechanism and are shaped and proportioned to support the various principal working parts of the mechanism in the desired cooperative relationship.

The lifter 12 is an elongate member in the form of a bar, preferably square in cross-sectional configuration, and is rotatably supported to extend across the path of movement of the machine in engagement with the ground over which the machine operates. The bar is supported to operate just beneath the normal surface S of the ground, say at a depth of about an inch or two below the surface of the ground, and it is preferably a rod about seven-eighths of an inch square. The bar is forced through the ground or surface soil as the machine advances and as it is thus moved through the soil it is rotated on its axis in a direction opposite to that in which the advance occurs or so that its forward or advancing side moves upwardly, as indicated by the arrow X in Fig. 4.

In practice the lifter bar may be supported in any suitable manner. In the case illustrated the bar is rotatably supported at each end by suitable bearing blocks 30 which hold the rod and are rotatably supported in the forward end portions of the frame arms 24.

In accordance with the preferred form of the invention the main rails 22 of the frame 21 are supported so that the forward end portion of the frame can be adjusted somewhat vertically and it is through this adjustment that the depth of the lifter bar in the ground can be varied as circumstances require. In the case illustrated frame supporting wheels 32 are adjustably supported by legs 33 depending from the rails 22 at points behind or rearward of the posts 23. In practice any suitable means may be provided for adjusting the legs 33 vertically, for instance, they may be screw threaded and carried in rotatable sleeves 34 adapted to be operated by a suitable crank 35. The wheels 32 are carried on a shaft 36 so that the shaft turns with the wheels.

The drive 18 provided for rotating the lifter bar as it advances through the soil may, in practice, be any suitable drive arrangement for applying power to the bar to rotate it at the desired speed and in the proper direction. In the case illustrated a chain drive 37 is shown provided between the wheel shaft 36 and a counter-shaft 38. A shaft 39 couples the counter-shaft 38 with the lifter rod through suitable universal joints 39ª.

The mechanism just described operates so that as the machine advances the lifter bar 12 is forced or pushed through the top soil just below the normal level of the soil and as it advances it is rotated so its advancing side moves upwardly with the result that it operates to form a small mound of dirt or soil M above and slightly ahead of it and the soil in this mound is moved or worked so that any object in it such as a nut that may have been embedded in it to any degree by falling from the tree is moved or worked up so that it finally rests on the top of the soil or is at the top of the mound in the position of the nut N in Fig. 4.

The elevating fingers 13 are spaced parallel fingers extending in the direction of movement of the machine or in a direction at right angles to the lifter bar 12 and the several fingers are uniform in size, shape and disposition. The fingers may vary somewhat in practice depending upon circumstances. However, in a simple form each bar involves a forward end or tip 40 which faces forward and somewhat downward a short distance behind the lifter bar and at an elevation slightly above the lifter bar but below the elevation of the top of the mound M formed by the lifter bar. The tips of the several fingers are preferably spaced a short distance rearward of the lifter bar so that they occur just behind the mound M, as shown in Fig. 4.

Each finger has a main or shank portion 41 which is curved and preferably disposed concentric with the propeller about to be described. The curved shanks of the fingers extend upwardly and rearwardly to the desired elevation. Where a device such as the conveyor 15 is employed the shanks extend up to a point well above the conveyor so that the nuts or other objects can be discharged from the upper ends or shanks to fall onto the conveyor.

In the preferred construction each finger has a rear end portion in the form of a guide 42 which extends rearward and downward from the upper end of the shank to facilitate in guiding the nuts onto the conveyor 15.

In practice the several fingers just described are spaced apart distances less than the diameters of the objects to be handled by the apparatus and being spaced they will clear or spill finely divided soil or other small objects that might otherwise be elevated by the mechanism.

The finger means further includes a frame member 44 which supports the several fingers. This frame member is preferably arranged to support the fingers from their lower or tip end portions. In the case illustrated the frame 44 is in the form of a horizontally disposed plate and the forward or tip end portions of the several fingers are secured to this member as by welding, or the like. By effectively securing the forward end portions of the fingers to the frame 44 it is unnecessary to otherwise support the other parts of the fingers.

The propeller 14 in its preferred form involves a round open or skeleton frame that I will term a drum 50 and which is rotatably supported by means of a shaft 51 on an axis located a suitable distance above the lifter bar 12. A plurality of circumferentially spaced ribs or fin-like members 52 project from the exterior of the drum 50 and terminate so that they will clear the top of the mound M by a substantial amount, so that they will in no way interfere with the dirt or soil of the mound.

A plurality of spaced fingers 53 project radially from the ribs 52. The fingers are sufficiently long to extend into the top portion of the mound so that they pass through or comb the soil forming the top of the mound. The fingers are further spaced apart to correspond to the spacing of the fingers 13 so that they can be operated to pass between the tips 40 and shanks 41 of the fingers 13. In the preferred arrangement the shanks of the fingers 13 are curved concentric with the drum 50 and the fingers 53 on the ribs of the drum are proportioned to just overlap or mesh into the fingers 13 so that objects such as nuts N may be moved by the fingers 53 onto the fingers 13 and as the fingers 53 advance they will push the objects or nuts N along the fingers 13 until they spill from the upper ends of the shanks 41 onto the conveyor 15.

It is to be understood, of course, that the drum 50 is rotated in the direction indicated by the arrow Y in Fig. 4. In the preferred form of the invention the shaft 51, which carries the drum 50, is adjustably supported by legs 55 depending from the forward portions of the rails 22 so that the vertical position of the drum 50 relative to the lifter bar 12 and fingers 13 can be varied to give the mechanism the desired action.

In the preferred form of the invention I provide means 19 for adjustably supporting the frame 44 of finger means 13. In a simple form the means 19 may involve mounting flanges 70 depending from the ends of the frame member 44 and bolts 71 may be provided for securing the flanges to the arms 24 of the frame. By providing a plurality of bolt holes in various positions, either in the flanges or in the arms 24, or both, I may be able to arrange the frame 44 in various positions relative to the lifting bar and drum 50. By suitably arranging the holes I am able to adjust the means 13 both vertically and horizontally.

The drive 20 for the propeller 14 may be any suitable driving or operating mechanism. For instance, as shown in the drawings it may involve a chain drive 60 connecting the shaft 36 of roller 32 with the shaft 51 of the drum 50. In practice I may provide means for removing light material such as leaves so they will not interfere with the action of the machine. I show a blower 100 driven by the engine of the tractor and a conduit 101 from the blower delivers air to a nozzle or series of nozzles 102 which are arranged so leaves, or the like, are blown away ahead of the pick-up.

It is to be understood that when I use the term "elevate" or refer to objects being "elevated" I mean to include, generally, means for guiding or directing the objects in the desired manner and in some instances there may be little or no actual vertical movement of the objects, but rather they may be received at about the level at which they are lifted by the lifter. Further, when I refer to a propeller having fingers I mean to include any similar structure such as a brush and if a brush is used I do not need to use spaced elevating fingers, but may use a plate-like structure instead.

From the foregoing description it will be apparent that I have provided a mechanism for effectively lifting objects such as nuts N from the ground so that they are deposited at a suitable point above the surface of the ground. It will be apparent that any suitable means may be provided for catching, storing, or handling the nuts once they have been picked up or elevated. In the particular case illustrated I have shown a longitudinal conveyor 16 arranged to receive the nuts from the belt conveyor 15 and to convey them rearwardly for deposit in the body 10 of the carrier C. It is, of course, to be understood that suitable drive means may be provided for operating the belt conveyors 15 and 16, and that in any particular adaptation of the present invention conveyors, or the like, may be provided or combined to move the objects that have been picked up to any desired point.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In a mobile machine of the character described, a rotating rod arranged transversely of the path of the machine and to operate in the ground, and means acting to engage and carry away objects elevated by the action of the rod including spaced elevating fingers.

2. In a mobile machine of the character described, a rotating rod arranged transversely of the path of the machine and to operate in the ground, and means acting to engage and carry away objects after they are elevated by the action of the rod including a propeller arranged to engage and move the objects.

3. In a mobile machine of the character described, a rotating rod arranged transversely of the path of the machine and to operate in the ground, and means acting to engage and carry away objects elevated by the action of the rod including spaced elevating fingers and a propeller for moving objects along the fingers.

4. In a mobile machine of the character described, a rotating rod arranged transversely of the path of the machine and to operate in the ground, and means acting to engage and carry away objects after they are elevated by the action of the rod including a revolving propeller coextensive with the rod and arranged to engage and move the objects.

5. In a mobile machine of the character described, a rotating rod arranged transversely of the path of the machine and to operate in the ground, and means acting to engage and carry away objects elevated by the action of the rod including spaced curved elevating fingers extending upwardly and rearwardly from the vicinity of the rod.

6. In a mobile machine of the character described, a rotating rod arranged transversely of the path of the machine and to operate in the ground, means acting to engage and carry away objects elevated by the action of the rod including spaced elevating fingers and a propeller for moving objects along the fingers, a transverse frame carrying the fingers and means supporting the frame for adjustment relative to the rod.

7. In a mobile machine of the character described, a rotating rod arranged transversely of the path of the machine and to operate in the ground, means acting to engage and carry away objects elevated by the action of the rod including spaced elevating fingers and a revolving propeller coextensive with the rod for moving objects along the fingers, a shaft carrying the propeller and means supporting the shaft for adjusting the propeller relative to the rod.

8. In a mobile machine of the character described, a rotating rod arranged transversely of the path of the machine and to operate in the ground, means acting to engage and carry away objects elevated by the action of the rod including spaced elevating fingers and a propeller for moving objects along the fingers, and drive means for the rod and propeller whereby they are operated in opposite directions.

9. In a machine of the character described, a frame, a revolving ground engaging supporting member adjustably connected with the frame, a rotary rod carried by the frame transverse of the path of the machine and in engagement with the ground, a revolving propeller coextensive with the rod and operable to engage and move objects after they are raised by the rod, and drive means operating the rod and propeller from said member.

10. In a machine of the character described, a frame, a revolving ground engaging supporting member adjustably connected with the frame, a rod rotatably carried by the frame transverse of the path of the machine and located below the surface of the ground, a revolving propeller transverse of the path of the machine and coextensive with the rod and operable to engage and move objects raised by the rod, spaced downwardly and forwardly extending fingers cooperating with the propeller to elevate objects moved by the propeller, and drive means operating the rod and propeller simultaneously in opposite directions.

MARSTON H. KIMBALL.

REFERENCES CITED

The following references are of record in the file of this patent:

UNITED STATES PATENTS

| Number | Name | Date |
|---|---|---|
| 26,118 | Otstot | Nov. 15, 1859 |
| 879,543 | Herberg | Feb. 18, 1908 |
| 1,466,889 | Mortensen | Sept. 4, 1923 |
| 1,723,608 | Dott | Aug. 6, 1929 |
| 2,406,976 | Walz | Sept. 3, 1946 |